March 2, 1926.
C. HAFNER
1,574,813
SUGAR DISPENSING DEVICE
Filed April 28, 1924
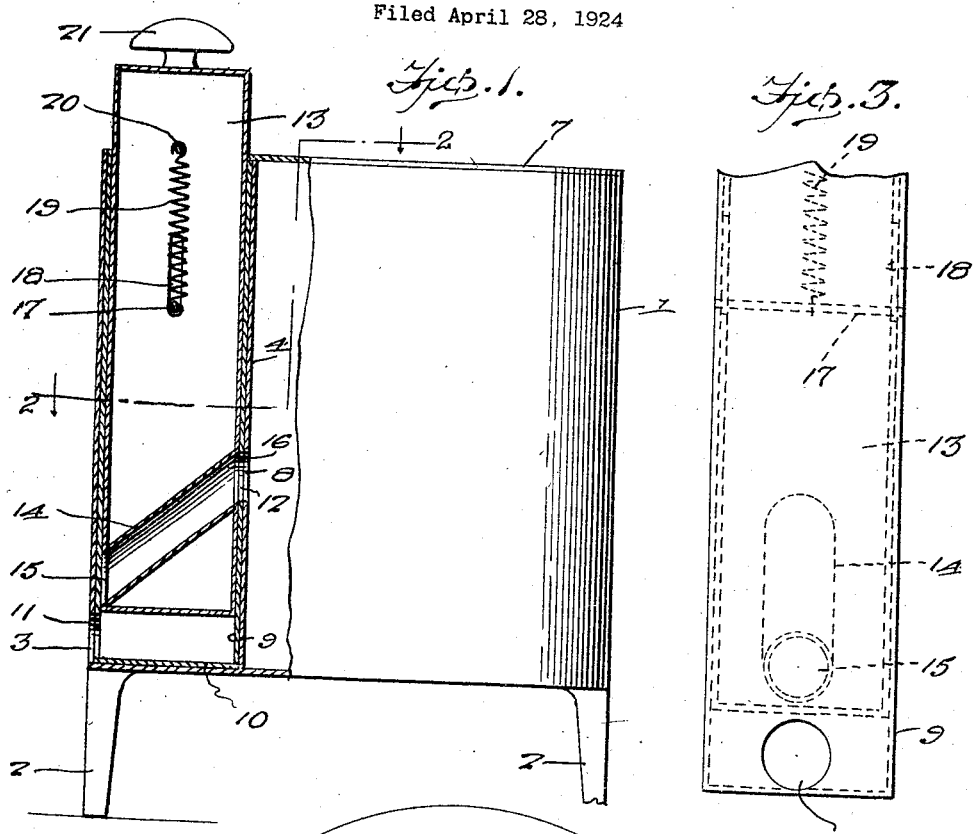
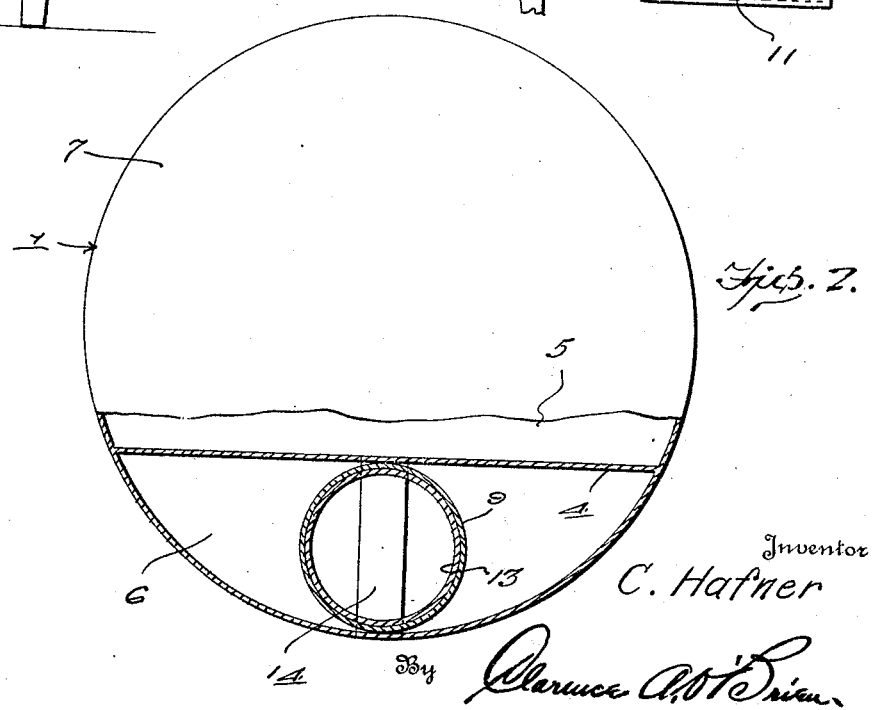
Inventor
C. Hafner
By Clarence A. O'Brien
Attorney Patented Mar. 2, 1926.

1,574,813

UNITED STATES PATENT OFFICE.

CARL HAFNER, OF ROCK SPRINGS, WYOMING.

SUGAR-DISPENSING DEVICE.

Application filed April 28, 1924. Serial No. 709,526.

*To all whom it may concern:*

Be it known that I, CARL HAFNER, a citizen of the United States, residing at Rock Springs, in the county of Sweetwater and State of Wyoming, have invented certain new and useful Improvements in a Sugar-Dispensing Device, of which the following is a specification.

This invention relates to new and useful improvements in dispensing devices and is more particularly adapted to a sugar dispenser and has for its principal object to provide a means whereby a predetermined quantity of sugar may be dispensed, thereby preventing any unnecessary loss or waste of the sugar.

A further object of the invention is to provide a sugar dispensing device of the above mentioned character, wherein means is provided for normally holding the dispensing apparatus in an inoperative position and simultaneously providing a means for receiving a predetermined quantity of sugar.

A still further object of the invention is to provide a sugar dispensing device of the above mentioned character, wherein when a predetermined quantity of sugar is being dispensed means is provided for simultaneously cutting off a further supply to the charge receiving chamber when the latter is in its discharging position.

A still further object of the invention is to provide a sugar dispensing device of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1 is a side elevation of a sugar container showing the dispensing apparatus therefor in section.

Figure 2 is a sectional view taken approximately on line 2—2 of Figure 1, and

Figure 3 is a fragmentary elevational view of the tubular member showing the plunger mounted therein.

In the drawing wherein for the purpose of illustration is shown the preferred embodiment of my invention, the numeral 1 designates a casing which is substantially cylindrical in the manner shown in Figure 2 of the drawing. Supporting legs such as shown at 2 are provided therefor whereby the same may be spaced from the table or other surface upon which the sugar container is placed. Provided in the wall of the cylindrical casing 1 adjacent the bottom thereof is the discharge opening 3. Extending vertically within the casing 1 and preferably arranged adjacent the discharge opening 3 is the partition 4 whereby a main compartment 5 and an auxiliary compartment 6 is provided in the manner shown in Figure 2 of the drawing. The cylindrical casing is open at its top and the main compartment 5 is provided with a hinged cover such as is shown at 7.

The main compartment 5 provides a means for containing a large quantity of sugar. The partition 4 is provided with an opening 8 which is preferably arranged centrally therein and at a point above the discharge opening 3 provided in the casing 1 in the manner clearly illustrated in Figure 1 of the drawing. The purpose of the provision of the opening in the partition will hereinafter be more fully described.

Arranged within the auxiliary compartment 6 and extending vertically therein is the tubular member 9 which is closed at its bottom as shown at 10 and has its upper end open. Arranged at diametrically opposite points in the lower portion of the tubular member 9 are the openings 11 and 12 respectively. The opening 11 is preferably formed adjacent the bottom 10 thereof and registers with the discharge opening 3 while the opening 12 registers with the opening 8 provided in the partition 4 in the manner clearly shown in Figure 1.

Adapted for longitudinal slidable movement within the tubular member 9 is the plunger 13. Within the lower portion of the plunger is the inclined tube 14 which provides a charge receiving chamber and the ends thereof communicate with suitable openings 15 and 16 respectively provided at diametrically opposite points in the plunger in the manner clearly shown in Figure 1. The upper end of the charge receiving portion 14 is adapted for communication with the openings 8 and 12 respectively while the opening 15 or the lower end of the charge receiving chamber is adapted for communication with the discharge openings 3 and 11 in the manner as will hereinafter be more fully described.

Carried by the tubular member 9 adjacent the upper portion thereof is a transversely extending pin 17 and the same extends through suitable elongated slots such as shown at 18 which are provided in the plunger. A spring such as is shown at 19 is fastened at one end to a suitable supporting pin 20 arranged within the upper portion of the plunger 13 while the opposite end of the spring 19 is in engagement with the transversely extending pin 17. This construction provides a means for normally holding the plunger in a lowered position whereby the charge receiving chamber 14 is out of communication with the openings 8 and 12 respectively while the lower end of the charge receiving chamber is disposed in registry with the openings 3 and 11 so that the sugar in chamber 14 may be discharged. When the tube 14 is raised to the position shown in Figure 1, the sugar contained in the main compartment 5 will be caused to pass through the openings 8 and 12 and fill the charge receiving chamber 14. The charge receiving chamber 14 is of such a construction as to hold approximately one teaspoonful of sugar and the same will be filled by the action of gravity due to the inclination of the tube 14.

When it is desired to discharge the predetermined quantity of sugar contained within the chamber 14 into a suitable cup which is placed below the discharge opening of the casing, a handle 21 which is provided on the upper end of the plunger is pushed downwardly so that the plunger 13 will travel downwardly into the tubular member 9 simultaneously cutting off a further supply of sugar from the main compartment to the chamber 14 and causing the discharge end of the chamber 14 to be brought into registry with the discharge openings 3 and 11 and by gravity, the sugar contained within the chamber 14 will be discharged outwardly into the receptacle placed below the discharge opening 3.

After the sugar within the chamber 14 has been dispensed therefrom, the plunger is released and the spring 19 will again return the same to its normal position whereby the discharge opening of the chamber is brought out of registry with the discharge openings 3 and 11 and the inlet opening of the chamber will again communicate with the openings 8 and 12 whereby a further supply of sugar from the main compartment 5 will be caused to fill the chamber by gravity. It is of course to be understood that the sugar within the main compartment 5 will at all times be above the openings 8 and 12 whereby the supply of sugar to the chamber 14 will at all times be certain.

By providing a sugar dispensing apparatus of the above mentioned character, only a predetermined quantity of sugar will be dispensed at one time, thereby preventing an unnecessary loss or waste of the sugar as frequently occurs when sugar is taken from a sugar bowl in the ordinary manner. A device of this character may furthermore be manufactured at a very low cost and will be especially useful in restaurants and similar places and the main compartment may be readily refilled whenever necessary in order to enable the dispensing apparatus to properly operate.

A dispensing apparatus of this character may not only be used for sugar, but may also be used for dispensing other granular material and I do not wish to limit myself to the particular use for which my device is adapted.

While I have shown the preferred embodiment of my invention, it is to be understood that various changes in the size, shape and arrangement of parts may be resorted to without departing from the spirit of the invention and the scope of the appended claim.

Having thus described my invention, what I claim is:—

A sugar dispenser comprising a casing provided at its side and in the vicinity of its bottom with an opening, a partition wall located within the casing and dividing the interior thereof into compartments, said partition wall being provided at a point spaced above the bottom of the casing with an opening, the said openings being located opposite each other but at different altitudes with relation to the bottom of the casing, a tubular member housed within one of the compartments in the casing and of a size to fit snugly between the partition and the wall of the casing, said tube having diametrically opposite openings which register with the openings in the partition wall and in the casing, a pin carried by the tubular member, a cylindrical plunger slidably received in the tubular member and provided with a slot which receives said pin, a spring connected at one end with the pin and at its other end with the plunger and housed within the plunger, the plunger being provided at its opposite side with openings adapted to register alternately with the openings in the tubular member, the partition wall and the casing and a tube located within the plunger and disposed in an inclined position and communicating at its opposite ends with the openings in the plunger.

In testimony whereof I affix my signature.

CARL HAFNER.